Aug. 10, 1954 W. E. REICHLE 2,686,257

RADIO TELEPHONE COMMUNICATION STATION

Filed March 15, 1950 4 Sheets-Sheet 1

INVENTOR
W. E. REICHLE
BY B. F. Stoddard
ATTORNEY

Aug. 10, 1954 W. E. REICHLE 2,686,257

RADIO TELEPHONE COMMUNICATION STATION

Filed March 15, 1950 4 Sheets-Sheet 2

INVENTOR
W. E. REICHLE
BY B. H. Stoddard
ATTORNEY

Aug. 10, 1954 W. E. REICHLE 2,686,257

RADIO TELEPHONE COMMUNICATION STATION

Filed March 15, 1950 4 Sheets-Sheet 3

INVENTOR
W. E. REICHLE
BY B. F. Stoddard
ATTORNEY

Aug. 10, 1954 W. E. REICHLE 2,686,257

RADIO TELEPHONE COMMUNICATION STATION

Filed March 15, 1950 4 Sheets-Sheet 4

INVENTOR
W. E. REICHLE
BY B. F. Stoddard
ATTORNEY

Patented Aug. 10, 1954

2,686,257

UNITED STATES PATENT OFFICE 2,686,257

RADIO TELEPHONE COMMUNICATION STATION

Winfried E. Reichle, Maplewood, N. J., assignor to Bell Telephone Laboratories, Incorporated, New York, N. Y., a corporation of New York Application March 15, 1950, Serial No. 149,837

4 Claims. (Cl. 250—13)

This invention relates to radio telephone communication systems and, more particularly, to equipment for use in a subscriber's mobile station in a multichannel two-way radio telephone communication system.

A two-way radio telephone communication system having a number of subscribers' stations that are mobile is usually operated on a two-frequency basis. In accordance with this method of operation, radiant energy of one frequency is employed for the transmission of messages from a fixedly located station to a mobile station and radiant energy of another frequency is used for the transmission of messages from a mobile station to a fixedly located station. These two frequencies constitute one two-way communication channel which is used by the subscribers in much the same manner as a conventional telephone party line. A single channel system of this type can be operated satisfactorily provided the number of subscribers is relatively small and provided the area served by the system is not large.

If either or both of the above-mentioned limiting factors is increased, better service can be obtained by using a multichannel system employing two or more two-frequency channels. For example, in the event that it is desired to extend a two-way radio telephone communication system over a wide area, it has been found to be advantageous to divide the service area into a number of geographic zones and to assign each channel for use exclusively in only one zone. In other words, one two-frequency channel is used exclusively by all the subscribers that are located in one zone and a different two-frequency channel is used exclusively by all the subscribers that are located in another zone. With this method of operation, when a subscriber's mobile station moves from one geographic zone to another, it is necessary for the subscriber to change the operating frequency of his radio equipment from operation over the channel assigned to the first zone to operation over the channel assigned to the second zone.

When there is a large number of subscribers in a particular zone, the party line type of service provided by using only one channel within that zone will be inadequate. It then becomes desirable to employ multichannel operation within that particular zone so that each subscriber located therein can initiate calls over any one of a number of two-frequency channels. With this method of operation, if a subscriber attempts to initiate a call over one channel and discovers that the channel is busy, he can then switch the operating frequency of his radio equipment to the two frequencies allotted to another channel.

Various methods may be employed for switching the operating frequency of a subscriber's radio equipment from one channel to another. One convenient method is to provide a subscriber's station with a plurality of different frequency-determining circuits which can be selectively connected to the transmitting and receiving oscillators at that station by means of a switching circuit controlled by a manually operable switch. Thus, when a subscriber moves his manual switch from one channel-selecting position to another, the different frequency-determining circuits are alternatively connected to the subscriber's transmitting and receiving oscillators for changing the frequency of the electric wave energy generated by them. Subscribers who request service in another zone in addition to their home zone may be provided with additional frequency-determining means and additional switch positions for use in the second zone.

The operating efficiency of a single zone multichannel radio telephone system can be improved if each subscriber located within the zone is assigned a particular two-frequency channel for preferential use in initiating and receiving calls, different groups of subscribers being assigned different channels so as to provide a balanced allotment of the channels available within the zone.

The two-frequency channel which is assigned to a subscriber for preferential use in initiating and receiving calls is normally referred to as his assigned channel and any other two-frequency channels which may be available to him for initiating calls when his assigned channel is busy are referred to as unassigned channels. Subscribers who request service in another multichannel zone in addition to their home zone and who have been provided with additional channel-selecting and frequency-determining means for use in the second zone may be assigned a second channel for preferential use in the second zone.

In accordance with this last-mentioned method of operation, when a subscriber wishes to initiate a call, he moves his manual switch to the assigned preferential channel-selecting position, thereby connecting his preferential frequency-determining means to his transmitting and receiving oscillators. If his assigned channel is busy, he then moves his manual switch to one of the unassigned channel-selecting positions thereby connecting an unassigned frequency-determining means to his oscillators. If the unassigned channel thus selected is also busy, this switching procedure is repeated until the subscriber finds an idle channel. Having found an idle channel, the subscriber then proceeds with the transmission of his message. By thus permitting a subscriber to initiate a call over an unassigned channel when the channel assigned to him for preferential use is busy, the operating efficiency of the system is improved because a subscriber will encounter fewer delays in making calls in accordance with this method of operation than he would if he were restricted to only one party line.

However, this method of operation has a tendency to complicate the procedure to be followed in calling a subscriber at a mobile station because a calling operator at a fixedly located station has no way of knowing the identity of the channel to which a subscriber's receiving equipment may be tuned at any particular time. Since a subscriber can receive calls only over the channel to which his receiving equipment is tuned and since a calling operator does not know which channel-selecting position has been selected by a subscriber's manual switch, it would be necessary for a calling operator to try to call a subscriber on first one channel and then another.

Such an unmethodical manner of calling a subscriber is both annoying and time-consuming and also involves unnecessary use of the channels. Therefore, in order to simplify the calling procedure and to place it on an orderly basis, the transmission of selective calling signals from a fixedly located station to a subscriber's mobile station is restricted to only the channel assigned to a subscriber for preferential use. In accordance with this method, after a subscriber has terminated the transmission of a message over an unassigned channel, the subscriber should move his manual switch to its assigned channel-selecting position so as to leave his receiving equipment tuned to the channel assigned to him for preferential use. In order to facilitate this procedure, the assigned channel-selecting position of a subscriber's manual switch may, if desired, be indicated in any suitable manner, such as by a distinctively colored mark.

Due to the fallibility of the human element, there may be occasions when a subscriber, after making a call over an unassigned channel, will forget to restore his manual switch to its assigned channel-selecting position. This is a serious mistake because it will leave the subscriber's receiving equipment tuned to an unassigned channel and the subscriber will be unable to receive calling signals as long as his receiving equipment is not tuned to his assigned channel. It is, therefore, important that, when such a departure from proper procedure occurs, it be corrected as soon as possible so that calls to that subscriber's station can be received.

Accordingly, it is an object of this invention to provide a subscriber in a two-way multichannel radio telephone communication system with an indication that he has terminated communication over an unassigned channel without restoring his station equipment to his assigned communication channel.

It is also an object of this invention to provide a subscriber's radio telephone station in a two-way multichannel radio telephone communication system with an indicator, operable only when the transmitting and receiving equipments at the station are in an idle condition, for indicating that the receiving equipment at the station is tuned to an unassigned communication channel.

These and other objects of the invention are accomplished by installing an indicating device, such as a buzzer, in a subscriber's radio telephone station in a two-way multichannel radio telephone communication system and by providing the indicating device with a normally open energizing circuit. In a preferred embodiment of the invention, the energizing circuit for the indicating device is closed in response to the operation of an electroresponsive device, such as a relay. This electroresponsive device is, in turn, supplied with a normally open energizing circuit which is closed whenever the channel-selecting switch at that station has been moved to an unassigned channel-selecting position. However, energization of the electroresponsive device in response to the closure of its energizing circuit is limited to periods when the transmitting and receiving equipment at that station is in an idle condition. This limiting function is performed by another electroresponsive device which disables the first electroresponsive device whenever the subscriber removes his telephone instrument from its hook switch.

In a modification of the invention, the indicating device is provided with an energizing circuit which is opened whenever the selector switch is in an assigned channel-selecting position and which is also opened when the selector switch is in an unassigned channel-selecting position during periods when the subscriber's telephone instrument has been removed from its hook switch.

In another modification of the invention, the energizing circuit for the indicating device has two portions connected in series, both of which must be closed in order to energize the indicating device. One portion of this energizing circuit is closed whenever the selector switch is in an unassigned channel-selecting position and the other portion is closed in response to the placing of the subscriber's telephone instrument on its hook switch.

These and other features of the invention are more fully discussed in connection with the following detailed description of the drawing in which.

Figure 1:
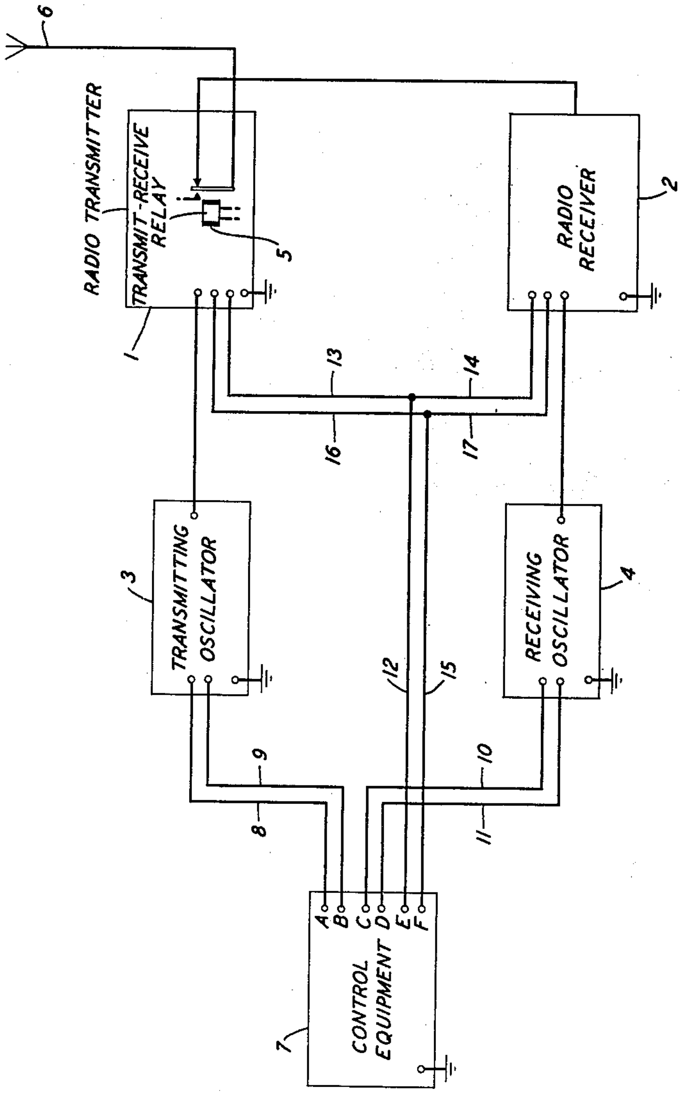
Fig. 1 is a schematic block diagram of a subscriber's radio telephone station in a duplex multichannel radio telephone communication system.

In Fig. 1, a subscriber's radio telephone communication station is shown to be provided with a radio transmitter 1 and a superheterodyne radio receiver 2. Exciting voltage for the radio transmitting equipment 1 is supplied by a transmitting oscillator 3, and beating oscillator voltage is applied to the radio receiving equipment 2 by a receiving oscillator 4. As is indicated in the drawing, the transmitting equipment 1 includes a conventional transmit-receive switching relay 5 for selectively connecting the antenna 6 to either the transmitter 1 or to the receiver 2. Energization of the relay 5 is controlled by the subscriber in the usual manner through the operation of a push-button on his telephone handset. The relay 5 is shown to be normally unenergized so that its armature is released and is in engagement with its back contact. This serves to connect the antenna 6 to the receiver 2 so that the subscriber's station equipment will normally be in condition for receiving a call.

Figure 2:
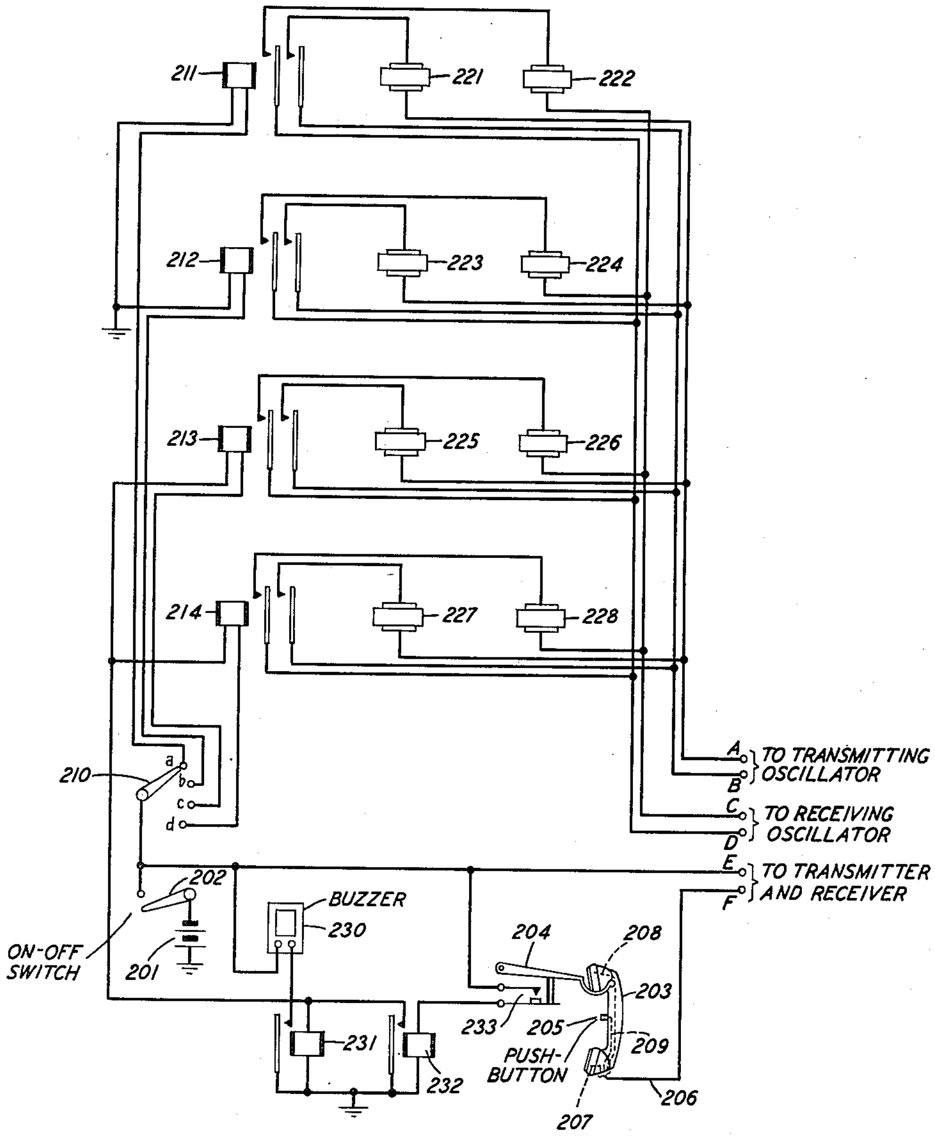
Fig. 2 is a circuit drawing of a preferred embodiment of the invention.
Figure 3:
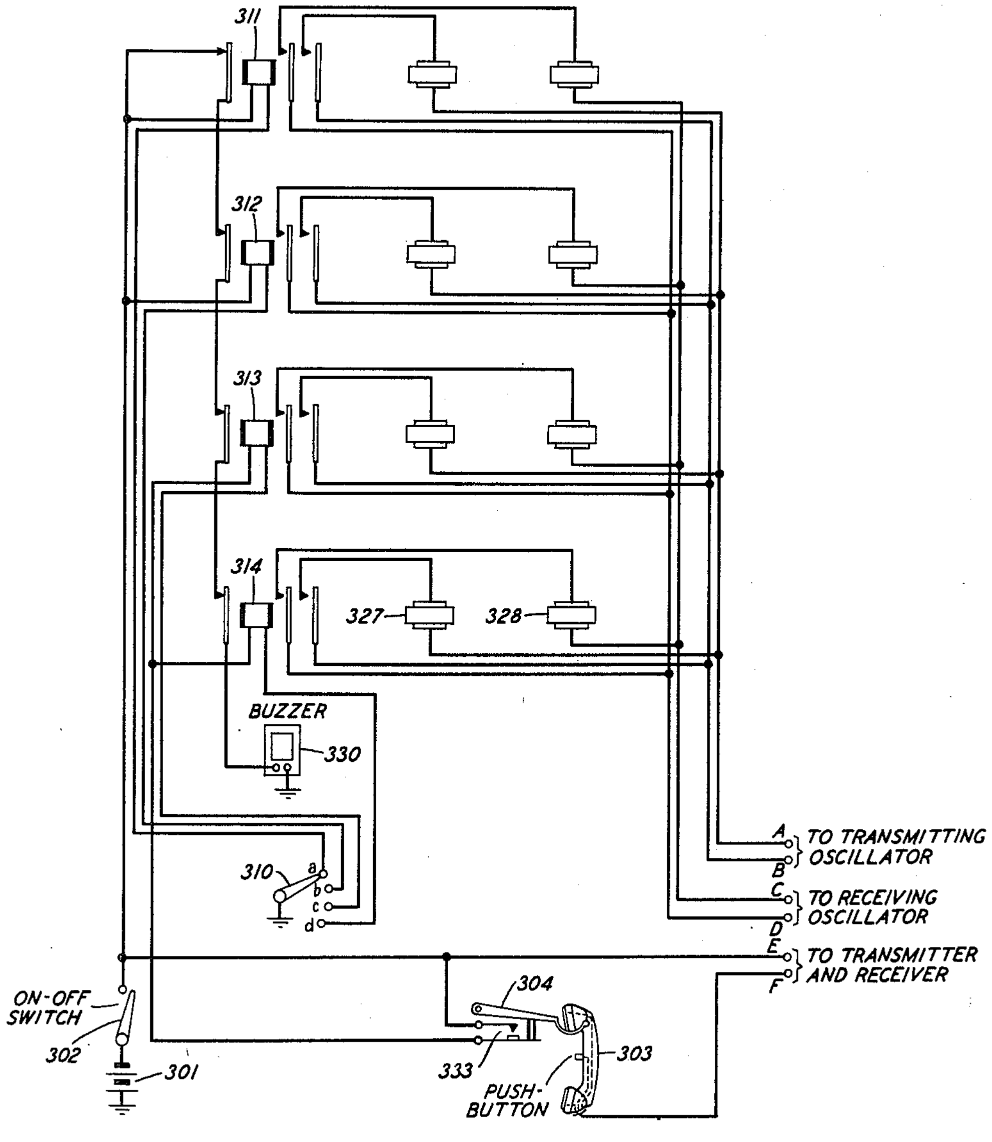
Figs. 3 and 4 are circuit drawings of alternative modifications of the invention.
Figure 4:
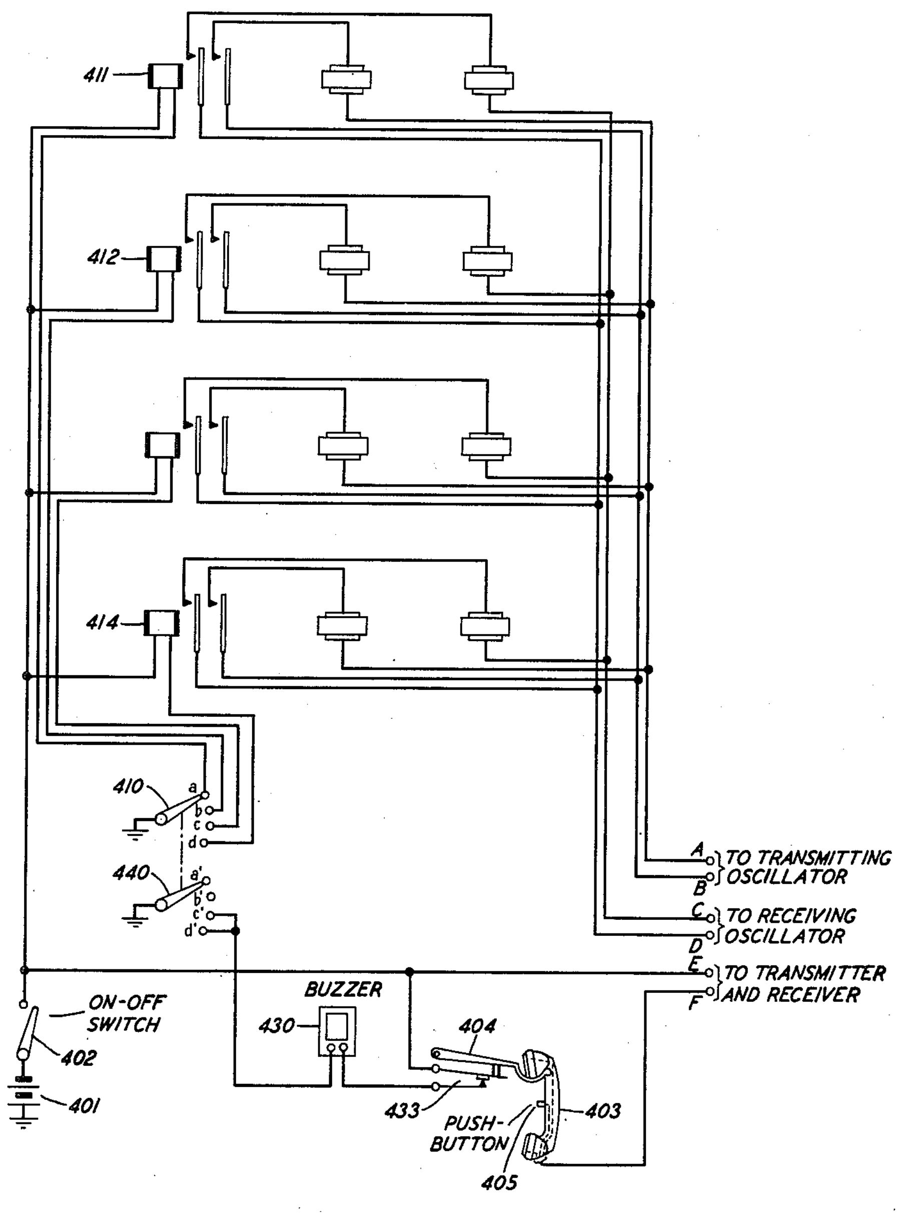

The subscriber's station also includes control equipment 7, three alternative embodiments of which are shown in detail in Figs. 2, 3 and 4. As is indicated in Fig. 1, the control equipment 7 is provided with a number of terminals A, B, C, D, E, and F which are also shown in Figs. 2, 3 and 4. Terminals A and B are connected by conductors 8 and 9 to the transmitting oscillator 3; terminals C and D are connected by conductors 10 and 11 to the receiving oscillator 4; terminal E is connected by conductors 12, 13 and 14 to both the radio transmitting equipment 1 and the radio receiving equipment 2; and terminal F is connected by cables 15, 16 and 17 to both the transmitter 1 and the receiver 2. The functions performed by these connections are fully discussed hereinafter in connection with the following detailed description of Figs. 2, 3 and 4.

A preferred embodiment of the control equipment 7 indicated schematically in Fig. 1, is illustrated in detail in Fig. 2 wherein it is shown to include a source of electric energy constituted by a battery 201, and a conventional on-off switch 202 for connecting the battery 201 over an obvious circuit to the terminal E. The electric power thus connected to the terminal E is supplied over the conductors 12, 13 and 14, shown in Fig. 1, to the radio transmitting and receiving equipments 1 and 2 for operation thereof.

The control equipment of Fig. 2 also includes a telephone handset 203 and a holder such as hook switch 204 for holding the telephone instrument 203 during idle periods when the subscriber is not using his radio transmitter 1 and radio receiver 2. The handset 203 is equipped with a conventional push-button 205 and the usual cord 206 including conductors 207, 208, and 209 for the microphone, the earphone, and the push-button 205, respectively. The cord 206 is connected to the terminal F which, in turn, is connected by the cables 15, 16, and 17 of Fig. 1 to the transmitter 1 and receiver 2. The push-button 205 functions in the usual manner to control the energization of the transmit-receive switching relay 5; that is, when the push-button 205 is depressed, it closes a conventional circuit for energizing relay 5. Energization of relay 5 causes it to operate its armature to switch the antenna 6 from the relay's back contact, which is connected to the receiver 2, to the relay's front contact, which is connected to the transmitter 1.

Closure of the on-off switch 202 applies current from battery 201 to a manually operable channel-selecting switch 210 which can be moved by the subscriber to any one of a number of different channel-selecting positions indicated by the contacts *a*, *b*, *c*, and *d*. Each of the contacts *a*, *b*, *c*, and *d* is connected over obvious circuits to a different one of a plurality of channel-selecting relays 211, 212, 213 and 214. Each of the switching relays 211, 212, 213 and 214 is provided with two armatures for connecting an associated pair of crystals 221 to 228, inclusive, across the terminals A, B, C, and D. When any one of the relays 211, 212, 213 and 214 is selected by the switch 210 for energization, the operation of one of the armatures of the selected relay will connect one of the associated pair of crystals, such as one of crystals 221, 223, 225, and 227, across terminals A and B and the operation of the other armature of the selected relay will connect the other of the associated pair of crystals, such as one of crystals 222, 224, 226 and 228, across terminals C and D.

As was stated above in connection with the description of Fig. 1, the terminals A and B are connected by the conductors 8 and 9 to the transmitting oscillator 3 and the terminals C and D are connected by conductors 10 and 11 to the receiving oscillator 4. Both of these oscillators 3 and 4 are of a type which generates electric wave energy of variable frequency, the frequency generated at any one time being determined by a frequency-determining circuit associated with the oscillator. This frequency-determining circuit may be of any appropriate design known to those skilled in the art. Preferably, it is of a type which controls the frequency generated by its associated oscillator by means of a selected one of a number of quartz crystals. Thus, the frequency of the electric wave energy generated by the oscillator can be readily changed by simply substituting a different crystal in the associated frequency-determining circuit.

Since each communication channel consists of one frequency for use in transmitting messages from the transmitter 1 and a different frequency for use by the receiver 2 in receiving messages, it is necessary to change both of these frequencies whenever the subscriber's radio communication equipment is switched from operation over one channel to operation over another channel. Therefore, each of the crystals 221, 223, 225, and 227 associated with the transmitting oscillator 3 is paired with a corresponding one of the crystals 222, 224, 226, and 228 associated with the receiving oscillator 4 so that the two crystals in each pair are associated with the same communication channel. With this arrangement of the crystals 221 to 228, inclusive, the subscriber's radio transmitting and receiving equipments 1 and 2 can be conditioned for operation over any one of the available communication channels by operating the channel-selecting switch 210 to effect the energization of any desired one of the relays 211, 212, 213, and 214 which, by operating its armatures, connects the appropriate pair of crystals to the oscillators 3 and 4.

As was stated above, in a radio telephone communication system of the type to which this invention is applicable, the subscriber is assigned one channel for preferential use when his mobile station is in one geographic zone and he may also be assigned a different channel for preferential use when his station is in another zone. In Fig. 2, one pair of crystals 221 and 222 are assigned for conditioning the oscillators 3 and 4 for operation over one preferential channel and another pair of crystals 223 and 224 are assigned for conditioning the oscillators 3 and 4 for operation over another preferential channel. The first pair of crystals 221 and 222 is selected when the manual switch 210 is moved to its contact *a*, and the second pair of crystals 223 and 224 is selected when the switch 210 is moved to its contact *b*.

If both of these preferential channels are busy when the subscriber wishes to initiate a call, he may move his channel-selecting switch 210 to either contact *c* or *d* to condition his radio equipment for operation over an unassigned channel. If one of these unassigned channels is idle, the subscriber may initiate his call over this channel and proceed with the transmission of a message. At the completion of the message, the subscriber should restore his switch 210 to one of the assigned channel contacts *a* and *b* because, as was explained above, he can receive calls only over the channels assigned to him for preferential use.

In order to indicate to the subscriber that he has terminated communication over an unassigned channel without restoring his station equipment to an assigned channel, the subscriber's station is provided with an indicating device in the form of a buzzer 230. It is to be understood that the invention is not limited to an audible indicator, such as the buzzer 230 or a bell, but may, if desired, employ a visual indicator, such as a lamp. One terminal of the buzzer 230 is connected through the on-off switch 202 to the power supply 201 and the other terminal is connected to the contact of an electromagnetic device, such as a relay 231. The relay 231 is conditioned for operation only in response to the selection of an unassigned channel by having one side of its winding connected to the windings of the unassigned channel-selecting relays 213 and 214.

Since it is undesirable for the indicator 230 to be operated during periods of communication, the energization of the relay 231 is controlled by a shunt path connected across its windings, this shunt path including the armature and contact of another electromagnetic device, such as a relay 232. The energizing circuit for the relay 232 includes a pair of contacts 233 on the hook switch 204. These contacts 233 are open when the station is in an idle condition, that is, when the handset 203 is on the hook switch 204, and are closed when the handset 203 is removed from the hook switch 204. Thus, the buzzer 230 will be operated only when the switch 210 is in one of its unassigned channel-selecting positions *c* or *d* and then only when the handset 203 is on the hook switch 204.

In operation, the subscriber first closes his on-off switch 202 to apply current from battery 201 over the terminal E to energize his radio equipments 1 and 2. In accordance with the usual practice, the switch 202 is maintained closed for the entire time that the subscriber is at his station. The subscriber then moves his manual switch 210 to the proper assigned channel-selecting position. For example, if his mobile station is in the geographic zone in which the channel determined by crystals 221 and 222 is assigned to him for preferential use, he moves his switch 210 to position *a* whereas, if his station is in the zone in which the channel determined by crystals 223 and 224 is assigned to him for preferential use, the switch 210 is moved to position *b*. Assuming that the subscriber has moved his switch 210 to the channel-selecting position *b*, current from battery 201 will energize relay 212 which will operate its armatures to connect crystal 223 to the transmitting oscillator 3 and crystal 224 to the receiving oscillator 4.

When the subscriber wishes to initiate a call, he removes his handset 203 from the hook switch 204 thereby causing the hook switch contacts 233 to close an obvious circuit for energizing relay 232 which operates its armature to close the shunt path across the winding of relay 231. If the subscriber discovers by listening to his handset 203 that this assigned channel is busy, he then moves his manual switch 210 to an unassigned channel-selecting position. Assuming this to be the switch contact *c*, an obvious circuit is now completed for current from battery 201 to energized relay 213. Although the placing of switch 210 in position *c* also completes a circuit extending from battery 201 to the winding of relay 231, relay 231 is, in effect, disabled by the closing of the shunt across its winding for as long a period as the handset 203 is off the hook switch 204. Relay 213 will now operate its armatures to switch the subscriber's equipment to operation over the two-frequency channel with which crystals 225 and 226 are associated. If this channel is free, the subscriber presses the push-button 205 to effect the energization of his transmit-receive relay 5 in a manner well known to those skilled in the art. Upon being energized, relay 5 operates its armature to switch the antenna 6 from the receiver 2 to the transmitter 1.

When the subscriber finishes this period of communication, he restores his handset 203 to the hook switch 204 and, if he follows the proper procedure, moves his selector switch 210 to the proper assigned channel-selecting contact *b*. Failure to do this will cause the buzzer 230 to become energized due to the fact that the placing of the handset 203 on the hook switch 204 causes the hook switch contacts 233 to open the energizing circuit of relay 232 which thereupon releases its armature thereby opening the shunt across the winding of relay 231 and thus permitting relay 231 to operate its armature to close the circuit for energizing the buzzer 230. The resulting operation of the buzzer 230 provides the subscriber with an audible indication that he has left his station equipment tuned to an unassigned channel. When the subscriber corrects this departure from proper practice by moving his selector switch 210 to the assigned contact *b*, the movement of the switch 210 away from the unassigned contact *c* opens the energizing circuit of relay 231 which thereupon releases its armature thereby opening the energizing circuit of the buzzer 230 and discontinuing its operation.

Various modifications in the design of the indicator circuit may be made without exceeding the scope of this invention. What is required is that the indicator shall be permitted to operate only during idle periods as it is obvious that its operation during busy periods would distract the subscriber's attention from the messages being transmitted. A modification within the scope of the invention is shown in Fig. 3 in which the channel-selecting relays 311, 312, 313, and 314 are each provided with a third armature represented at the left of each relay. These additional armatures are all connected in series in a circuit extending from the buzzer 330 to the battery 301. When the subscriber has placed his channel-selecting switch 310 in either of the two assigned channel-selecting positions *a* or *b*, an obvious circuit is closed for energizing the selected one of the two associated preferential channel-selecting relays 311 and 312. The buzzer 330 will not be energized at this time because its energizing circuit will be opened by the operation of the left armature of either relay 311 or relay 312. This will be true regardless of whether the handset 303 is on the hook switch 304.

If the subscriber wishes to initiate a call and if the channel assigned for preferential use is busy, he moves his selector switch 310 to an unassigned contact, such as *d*. Since it is assumed that the handset 303 has now been removed from the hook switch 304, the hook switch contacts 333 are therefore closed to complete a circuit for energizing relay 314. This circuit extends from battery 301, over the on-off switch 302 which is closed during the time that the subscriber is at the station, through the closed hook switch contacts 333, winding of relay 314, and then over contact *d* and switch 310 to ground. Upon being thus energized, relay 314 will operate its armatures, the two right armatures operating to connect crystal 327 across terminals A and B and crystal 328 across terminals C and D. At the same time, the operation of the left armature of the relay 314 will open the energizing circuit of buzzer 330. If the unassigned channel thus selected is idle, the subscriber proceeds with the transmission of a message.

At the termination of this period of communication, the subscriber will place his handset 303 on its hook switch 304 thereby opening the hook switch contacts 333 which, in turn, open the energizing circuit of relay 314 which thereupon releases its armatures. The release of the two right armatures of relay 314 opens the circuits associated with the crystals 327 and 328. In order for the station equipment to be tuned to an assigned channel so that the receiver 2 will be conditioned to receive an incoming call, it is necessary for the subscriber to move his selector switch 310 to the appropriate one of the assigned channel contacts *a* and *b*. As was described above, this will open the energizing circuit of buzzer 330 and will prevent its operation at this time.

If the subscriber forgets to restore the selector 310 to an assigned contact *a* or *b* and leaves it in the unassigned position *d*, then the release of the left armature of relay 314 will close the circuit extending from the battery 301 through the buzzer 330. This causes the operation of the buzzer 330 thereby notifying the subscriber of his failure to follow proper operating practice. The buzzer 330 will remain operated until the subscriber moves the selector switch 310 to either contact *a* or *b* associated with the preferential channel-selecting relays 311 and 312 which, as was described above, will open the energizing circuit of the buzzer 330.

In Fig. 4, another modification of the invention is shown as having a pair of contacts 433 which are so constructed and arranged as to be closed when the station equipment is in an idle condition, that is, when the telephone instrument 403 is placed on the hook switch 404. Also, in this form of the invention, the manual selector switch 410 is provided with an additional switch member 440 and an additional switch wafer having contacts *a'*, *b'*, *c'* and *d'* corresponding to the channel-selecting contacts *a*, *b*, *c*, and *d*. As is indicated in the drawing, the switch member 440 is so connected with the selector switch 410 that any operation of the manual switch 410 will cause a similar operation of the switch member 440. In other words, when the switch 410 is moved to any one of its contacts *a*, *b*, *c* or *d*, the switch member 440 will be moved to a corresponding contact *a'*, *b'*, *c'*, or *d'*. The switch positions *a'* and *b'*, which correspond to the assigned channel contacts *a* and *b*, are not wired; but the switch positions *c'* and *d'*, which correspond to the unassigned channel contacts *c* and *d*, are each connected to one side of the buzzer 430. The other side of the buzzer 430 is connected to one of the hook switch contacts 433 and the other one of this pair of contacts 433 is connected through the on-off switch 402 to the battery 401.

In the operation of this modification of the invention, the subscriber selects the proper assigned channel by moving his selector switch 410 to the appropriate one of the contacts *a* and *b* thereby closing an obvious circuit for current from battery 401 to energize the selected one of the assigned channel relays 411 and 412. Although the operation of the switch 410 causes a corresponding operation of the switch member 440, no useful function is thereby performed because neither of the additional wafer contacts *a'* or *b'* is wired. The subscriber now removes his handset 403 from the hook switch 404 and listens to determine whether the selected channel is idle.

If the selected assigned channel is busy, the subscriber then moves his selector switch 410 to one of the unassigned channel contacts such as *d*. This closes an obvious circuit for energizing relay 414. At the same time, the operation of the selector switch 410 to its contact *d* causes the switch member 440 to be similarly operated to its corresponding contact *d'*. Although this operation connects ground over switch member 440 to one side of buzzer 430, the buzzer 430 will not be energized at this time due to the fact that the hook switch contacts 433 are now open. In other words, the movement of the switch member 440 to either one of contacts *c'* or *d'* will, at this time, merely prepare or condition the buzzer 430 for operation whenever the hook switch contacts 433 become closed.

Assuming the selected unassigned channel to be free, the subscriber pushes his push-button 405 and initiates his call. At the end of this communication period, the subscriber should restore his switch 410 to one of the assigned channel contacts *a* and *b* before he restores his handset 403 to the hook switch 404. If he fails to do this, then the placing of the handset 403 on the hook switch 404 will close the hook switch contacts 433 thereby completing the circuit for energizing the buzzer 430. Upon hearing the buzzer 430, the subscriber will be reminded of his failure to follow proper operating practice and will accordingly move his switch 410 to one of the assigned contacts *a* and *b*. This will cause the switch member 440 to be similarly operated to one of the unwired contacts *a'* and *b'*, thereby opening the energizing circuit of the buzzer 430 and discontinuing its operation.

It is to be understood that the invention is not limited to the specific number of assigned and unassigned channel-selecting equipments shown in the drawing but may employ either more or less of such equipments as may be necessary to meet the requirements of a particular radio telephone communication system. It is to be further understood that various modifications may be made in the apparatus and circuits shown in the drawing without departing from the scope of the invention which is to be limited only by the claims appended hereto.

What is claimed is:

1. A radio telephone communication station having multichannel radio telephone communication equipment, a channel selector switch movable to any one of several positions for effecting the conditioning of said equipment for use with any one of a plurality of assigned radiant energy communication channels, said channels being classified into a first group and a second group, a telephone instrument connected to said equipment and having an operating position and a non-operating position, a single indicator for indicating only after said instrument has been placed in its non-operating position that said switch has been left in any one of its positions for selecting a channel in said second group, a circuit for energizing said indicator, said circuit being normally open, first means for preparing for closure of said energizing circuit, said first means being responsive to the moving of said switch to any one of its positions for selecting a channel in said second group, and second means for effecting the closure of said energizing circuit after it has been prepared for closure by said first means, said second means being responsive to the placing of said telephone instrument in its non-operating position.

2. A radio telephone communication station in accordance with claim 1 wherein said first means include a first electroresponsive device for closing said circuit for energizing said indicator, a second circuit for energizing said first device, said second circuit being normally open, said second circuit being closed by said switch only when it is moved to any one of its positions for selecting a channel in said second group and being opened by said switch when it is moved to any one of its positions for selecting a channel in said first group, said second means including a third circuit for shunting said first electroresponsive device, said third circuit being normally open, a second electroresponsive device for closing said third circuit, a fourth circuit for energizing said second electroresponsive device, said fourth circuit being normally open, and control means for closing said fourth circuit in response to the placing of said telephone instrument in its operating position and for opening said fourth circuit in response to the placing of said instrument in its non-operating position.

3. A radio telephone communication station in accordance with claim 1 wherein said first means include a plurality of electroresponsive means for closing portions of the circuits for energizing said indicator, a first group of said electroresponsive means having their energization selectively controlled by said channel selector switch independently of the position of the telephone instrument, said second means including contact means operated in accordance with the position of said telephone instrument for jointly controlling with said channel selector switch the selective energization of a second group of said electroresponsive means.

4. A radio telephone communication station in accordance with claim 1 wherein said first means include a second switch operated in tandem with said channel selector switch for closing a first portion of the circuit for energizing said indicator, said second means including contact means for closing a second portion of said energizing circuit, said contact means being opened by said telephone instrument when in its operating position and being closed by said telephone instrument when in its non-operating position.

References Cited in the file of this patent

UNITED STATES PATENTS

| Number | Name | Date |
|---|---|---|
| 1,688,454 | Demarest et al. | Oct. 23, 1928 |
| 2,263,755 | Bock | Nov. 25, 1941 |
| 2,265,056 | Bowers | Dec. 2, 1941 |
| 2,341,224 | McDonald et al. | Feb. 8, 1944 |
| 2,383,908 | Bowers | Aug. 28, 1945 |
| 2,441,570 | Glessner | May 18, 1948 |
| 2,458,558 | Bradley | Jan. 11, 1949 |
| 2,512,613 | Devaux | June 27, 1950 |